United States Patent [19]

Kawabata et al.

[11] Patent Number: 5,309,970
[45] Date of Patent: May 10, 1994

[54] PNEUMATIC SAFETY TIRES

[75] Inventors: Misao Kawabata, Tokorozawa; Yutaka Yamaguchi, Urawa; Takuo Yasuda, Tokorozawa, all of Japan

[73] Assignee: Bridgestone Corporation, Tokyo, Japan

[21] Appl. No.: 886,192

[22] Filed: May 21, 1992

[30] Foreign Application Priority Data

May 22, 1991 [JP] Japan ................................. 3-117572

[51] Int. Cl.$^5$ ............................................... B60C 17/00
[52] U.S. Cl. ................................... 152/517; 152/541; 152/546; 152/555
[58] Field of Search ............... 152/516, 517, 520, 541, 152/555, 546

[56] References Cited

U.S. PATENT DOCUMENTS

| 4,261,405 | 4/1981 | Yamauchi et al. | 152/555 |
| 4,287,924 | 9/1981 | Deck et al. | 152/517 |
| 4,510,984 | 4/1985 | Kishida et al. | 152/541 |
| 4,779,658 | 10/1988 | Kawabata | 152/517 |
| 5,060,707 | 10/1991 | Sumikawa | |

FOREIGN PATENT DOCUMENTS

| 0005399 | 11/1979 | European Pat. Off. | |
| 2469297 | 5/1981 | France | 152/517 |
| 2624442 | 12/1987 | France | |
| 0023705 | 2/1984 | Japan | 152/541 |
| 2053612 | 2/1990 | Japan | |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A pneumatic tire comprising a cylindrical tread, a pair of sidewalls, bead rings, a radial carcass, rubber fillers each arranged between each turn-up portions and a main body of the carcass and extending from above the bead ring toward the tread portion such that the radially sectional shape of the rubber film becomes narrower toward the tread portion, and a pair of thick rubber reinforcement layers arranged on respective axially inner sides of the carcass in the sidewall portions. Each of the rubber reinforcement layers is constituted by first and second reinforcing rubber layers, the first reinforcing rubber layer occupying a radially outer side of the sidewall portion and the second reinforcing layer being continued to a radially inner side of the first reinforcing rubber layer through an inclined joint surface and arranged on radially outer side of the rubber filler through the main body of the carcass, Shore A hardness of the rubber reinforcement layer is made greater in the order of the first reinforcing rubber layer, the second reinforcing rubber layer and the rubber filler, and the rubber volume of the reinforcing rubber reinforcement layer is made greater reversely in the order of the rubber filler, the second reinforcing layer and the first reinforcing layer.

4 Claims, 2 Drawing Sheets

PNEUMATIC SAFETY TIRES

BACKGROUND OF THE INVENTION (1) Field of the Invention

The present invention relates to an improvement in pneumatic safety tires, and more particularly the invention relates to pneumatic safety tires having improved riding comfortability against vibrations (hereinafter referred to as anti-vibration riding comfortability) as well as improved durability in upper regions of sidewall portions.

(2) Related art statement

Since safety tires can be run flat over some distance even under a reduced inner pressure as is, when the inner pressure of the tire decreases due to trouble such as a puncture, such safety tires have recently come to be used because of their safety performance.

Known structures for the safety tires capable of being run flat include, a double wall structure, a tire interior-supporting coat structure, and a tire sidewall-reinforcing structure as shown in FIG. 2 are known. Among them, a side-reinforced tire having inner surfaces of the sidewall portions reinforced mainly with rubber layers has been put into practical use due to its lower production cost, excellent rim-assembling performance and excellent run-flat running performance.

That is, FIG. 2 is a sectional view illustrating a conventional side-reinforced safety tire. In this conventional safety tire, a pair of sidewall portions 1 extend substantially radially inwardly from opposite ends of a cylindrical tread T, respectively, bead rings 2 are buried in tip end portions of the respective sidewall portions 1, and a carcass 3 consisting of at least one ply having fiber cords arranged is turned up around the respective bead rings 2 from an axially inner side to the axially outer side, and each of turn-up portions 3' of the carcass is formed at a relatively radially low position.

A rubber filler 4 is arranged between the main body and the turn-up portion 3' of the carcass 3. This rubber filler has a triangular sectional shape contacting the bead ring 2 at its base portion, and is made of a relatively hard rubber having, for example, Shore A hardness of 70-98 and a large volume. Further, the tire is reinforced by arranging a thick rubber reinforcement layer on an axially inner side of the carcass 3 in the sidewall portion.

The rubber reinforcement layer is divided substantially in a direction of a rotary axis of the tire (hereinafter referred to as "axial direction"), and is constituted by the relatively soft first reinforcing rubber layer 5 having, for example a Shore A hardness of 60-80 and positioned outwardly in the axial direction and the relatively hard second rubber reinforcing layer 6 having, for example, a Shore A hardness of '5-90 and positioned inwardly in the axial direction.

A relatively soft rubber chaffer 7 having excellent wear resistance is arranged axially outwardly along the turn-up portion 3' of the carcass from a radially inner end portion of the bead portion which contacts a rim when the tire is fitted to the rim. Following the rubber chaffer 7, the sidewall portion is entirely covered with a side rubber 8 having excellent bending resistance.

However, with respect to the conventional safety tire, particularly, a conventional high performance tire having the above construction, not only high running performance but also excellent living comfortability, particularly, anti-vibration riding comfortability during ordinary running (no run-flat running) are required. However, since the sidewall portions and the bead portions are entirely reinforced with relatively hard rubber as mentioned above, anti-vibration riding comfortability particularly during ordinary running is unfavorably poor.

Since the above-mentioned conventional safety tire largely changes its curvature during run-flat running in the case of puncture, the rubber reinforcing layer is cracked on its inner surface in the upper part of the sidewall portion by synergistic effects of stress concentration, heat generation and heat accumulation. Consequently, such cracks are likely to be propagated to unfavorably cut the carcass.

In particular, since the rubber filler 4 has a relatively large volume and is surrounded by the main body and the turn-up portion of the carcass 3, its rigidity, particularly its bending rigidity becomes extremely high. Consequently, this causes not only stress concentration in the upper part of the sidewall portion but also reduction in anti-vibration riding comfortability.

SUMMARY

The pneumatic safety tire according to the present invention has been accomplished through examination and solution of the problems possessed by the above-mentioned conventional pneumatic tires.

Therefore, it is an object of the present invention to provide a pneumatic safety tire which simultaneously improves not only anti-vibration riding comfortability but also durability in the upper parts of the sidewall portions.

That is, the pneumatic tire according to the present invention is characterized by including a cylindrical tread portion, a pair of sidewall portions radially inwardly extending from opposite ends of the tread portion and having respective bead rings buried at tip ends thereof, respectively, a radial carcass toroidally extending from one bead ring to the other bead ring through one sidewall portion, the tread portion and the other sidewall portion and also reinforcing the sidewall portions and the tread portion, each of opposite end portions of the carcass being turned up around the bead ring axially from inside to outside, rubber fillers each arranged between the turn-up portions and a main body of the carcass and extending from above the bead ring toward the tread portion such that the radially sectional shape of the rubber filler becomes narrower toward the tread portion, and a pair of thick rubber reinforcement layers arranged on respective axially inner sides of the carcass in the sidewall portions, wherein each of the rubber reinforcement layers is constituted by first and second reinforcing rubber layers, the first reinforcing rubber layer occupying a radially outer side of the sidewall portion and the second reinforcing layer being continued to a radially inner side of the first reinforcing rubber layer through an inclined joint surface and arranged on a radially outer side of the rubber filler through the main body of the carcass, Shore A hardness of the rubber reinforcement layer is made greater in the order of the first reinforcing rubber layer, the second reinforcing rubber layer and the rubber filler, and the rubber volume of the reinforcing rubber reinforcement layer is made greater reversely in the order of the rubber filler, the second reinforcing layer and the fist reinforcing layer.

As mentioned above, according to the pneumatic safety tire of the present invention, Shore A hardness of the rubber reinforcement layer becomes greater in the order of the first reinforcing rubber layer, the second reinforcing rubber layer and the rubber filler, and the rubber volume of the rubber reinforcement layer becomes greater reversely in the order of the rubber filler, the second reinforcing layer and first reinforcing layer. Consequently, the entire rubber reinforcement layer including the rubber filler is well balanced, so that vibrations applied to the tire from road are mitigated to enhance a vibration-attenuating effect, and that local stress concentration is prevented to make cracking, heat generation or heat accumulation difficult to occur in the inner surfaces of the sidewall portions of the tire.

Further, since the first and second reinforcing rubber layers are continued to each other through the inclined joint surface on the radially inner side of the first reinforcing rubber layer, a high rigidity discontinuous face in the sidewall portion is eliminated to improve the anti-vibration riding comfortability and further to prevent local stress concentration upon the inner surface of the sidewall portion so that fracture at a boundary between the first and second rubber layers made of different rubber materials can be prevented.

These and other objects, features and advantages of the invention will be appreciated upon reading of the following description of the invention when taken in conjunction with the attached drawings, with the understanding that some modifications, variations and changes of the invention will be made by the skilled person in the art to which the invention pertains without departing from the spirit of the invention or the scope of claims attached hereto.

BRIEF DESCRIPTION OF THE DRAWINGS

For a better understanding of the invention, reference is made to the attached drawings, wherein.

DETAILED DESCRIPTION OF THE INVENTION

Figure 1:
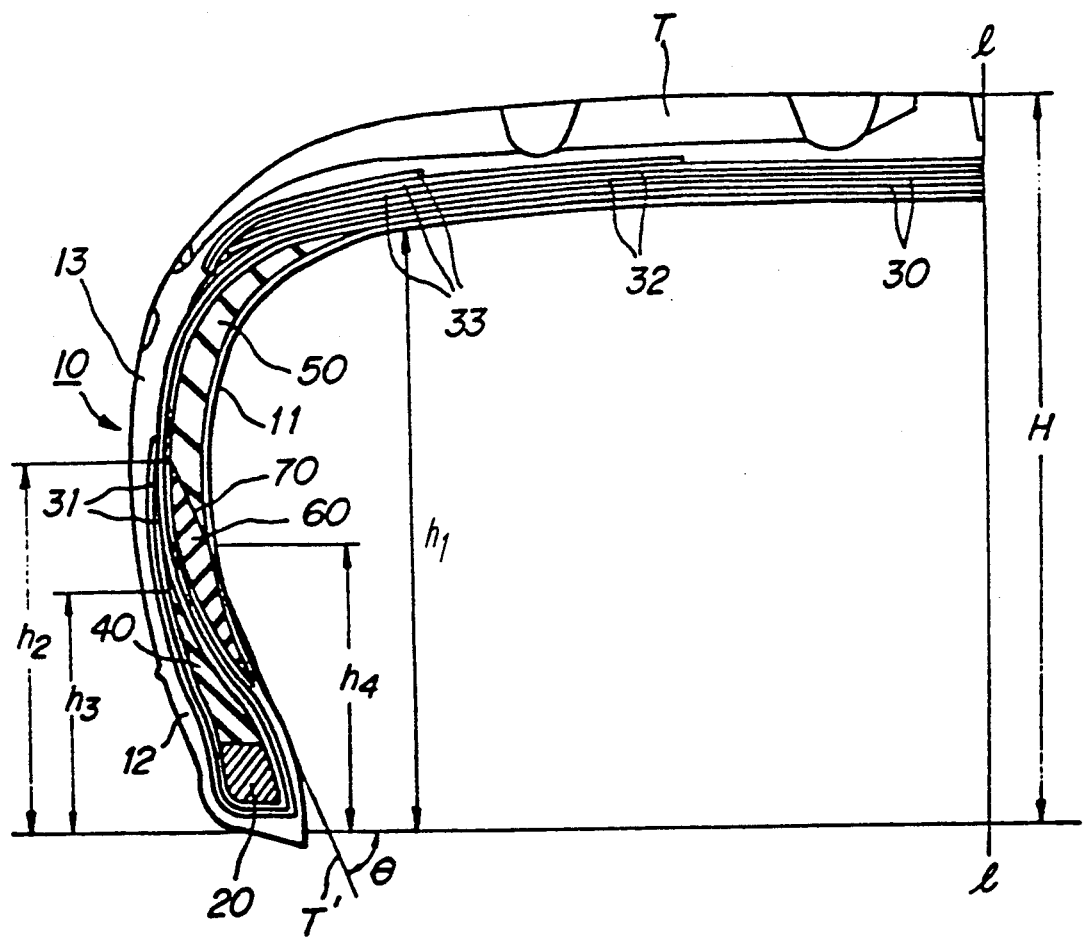
FIG. 1 is a sectional view illustrating one embodiment of the pneumatic safety tire according to the present invention.

The pneumatic safety tire according to the present invention will be explained in detail with reference to the attached drawings:

Referring to FIG. 1 for the explanation of one embodiment of the pneumatic safety tire according to the present invention, the pneumatic safety tire includes a cylindrical tread portion T contacting road, and a pair of sidewall portions 10 extending radially inwardly from opposite ends of the tread portion T and having bead rings 20 buried in tip end portions thereof, respectively.

The tire is reinforced with a radial carcass 30 extending from one of the bead rings 20 to the other through the side wall portions and the tread portion. The carcass 30 is composed of two plies in which organic fiber cords made of rayon or polyester are arranged in a direction crossing an equatorial plane of the tire substantially at a right angle. Each of opposite ends of the carcass 30 is turned up around the bead ring 20 from the axially inner side to the axially outer side. The turn-up portion 31 of the carcass 30 is extended up to a position relatively lower in the portion 10, that is, a position radially outwardly that slightly exceeds an upper end of a flange of a rim to which the tire is fitted.

A rubber filler 40 is arranged radially outwardly from the bead ring 20 between the turn-up portion 31 and a main body of the carcass 30, and the filler 40 exhibits such a substantially triangular cross sectional shape narrowed toward the tread portion T from above the bead ring 20.

The tread portion T above the carcass 30 is reinforced with a belt layer 32 and an auxiliary belt layer 33 arranged radially outwardly on the belt layer 32. The belt layer 32 is composed of at least two plies in which non-stretchable cords such as steel cords are inclinedly arranged such that the cords in one ply are crossed to those in an adjacent ply. The auxiliary belt layer 33 is composed of at least two plies in which thermally shrinkable cords such as of nylon are arranged in parallel to the equatorial plane of the tire.

A portion of the sidewall portion 10 located on an axially inner side of the carcass 30 is reinforced with thick rubber reinforcement layer. This thick rubber reinforcement layer is constituted by a first reinforcing rubber layer 50 and a second reinforcing rubber layer 60. The first reinforcing rubber layer 50 occupies a radially outer side in the side wall 10. The second reinforcing rubber layer 60 continues to the first reinforcing rubber layer 50 on a radially inner side of the first layer through an inclined joined surface 70, and occupies a radially outer side of the rubber filler 40 through the carcass 30.

The first reinforcing rubber layer 50 is located on the axially inner side of the carcass 30, and reinforces the sidewall portion 10 mainly in the radially outer region in an area from a tire shoulder portion to the sidewall portion 10. The thickness of the first reinforcing rubber layer is gradually reduced toward the radially outer and inner portions.

The second reinforcing rubber layer 60 reinforces the sidewall portion mainly in the radially inner region located radially inwardly under the first reinforcing rubber layer 50. The radially inner end of the second reinforcing rubber layer 60 is extended to a region radially completely falling in the height are of the rubber filler 40. The thickness of the radially outer and inner portions of the second reinforcing laye is gradually reduced as in the case with the first reinforcing rubber layer 50.

An inner liner 11 made of an ordinary rubber is arranged on an axially inner side of the first reinforcing rubber layer 50 and the second reinforcing rubber layer 60.

The axially outer side of the sidewall portion 10 is entirely covered with an outer cover rubber. This cover rubber is constituted by a relatively soft rubber chaffer 12 having excellent wear resistance and a side rubber 13 having excellent bending resistance. The rubber chaffer and the side rubber are extended radially outwardly from a radially inner end portion to be contacted with a rim when the tire is mounted on the rim, and arranged on the axially outer side along the turn-up portion 31 of the carcass. The side rubber 13 covers the entirety of the sidewall portion 10 following the rubber chaffer 12.

In the above construction, according to the pneumatic safety tire of the present invention, Shore A hardness and the volume are specified with respect to the rubber filler 40, the first reinforcing rubber layer 50 and the second reinforcing rubber layer 60 as follows.

That is, the Shore A hardnesses of the rubber filler 40, the first reinforcing rubber layer 50 and the second reinforcing rubber layer 60 are successively decreased from the radially inner side to the radially outer side, that is, in the order of the rubber filler 40>the second reinforcing rubber 60>the first reinforcing rubber 50.

The Shore A hardness is specified in Japanese Industrial Standard (JIS). It is preferable that the Shore A hardness is set at 74° to 98° for the rubber filler 40, 60°-90° for the second reinforcing rubber layer 60, and 60° to 85° for the first reinforcing rubber layer. Although the Shore A hardnesses are selected in the above respective ranges for the rubber filler and the first and second reinforcing rubber layers, needless to say, the Shore A hardnesses needs to satisfy the hardness relationship of the rubber filler 40>the second reinforcing rubber layer 60>the first reinforcing rubber layer in this order.

Further, it is preferable that resilience (specified in JIS) of the first rubber layer 50 is smaller than that of the second reinforcing layer 60.

The volumes of the rubber filler 40, and the first and second reinforcing rubber layers 50 and 60 are successively increased from the radially inner side to the radially outer side, that is, the volume is increased in the order of the rubber filler 40<the second reinforcing rubber layer 60<the first reinforcing rubber layer 50.

The volume rates of the rubber filler 40 and the first and second reinforcing rubber layers 50 and 6 with respect to the total reinforcing rubber of the filler and the first and second reinforcing rubber layers are preferably 10 to 20%, 15 to 35% and 45-70%, respectively.

The inclined joint surface 70 as a boundary between the first reinforcing rubber layer 50 and the second reinforcing rubber layer 60 preferably satisfies a requirement that an angle $\theta$ measured on an acute angle side between a straight line T' extended from the joint surface and a line parallel to the tire axis is 50° to 80°, the straight line T' being downwardly inclined toward the axially inward direction of the tire.

When the reinforcing rubber layers are constituted as mentioned above, the total balance of the reinforcing rubber layers including the rubber filler is improved. Particularly, an attenuating effect of the reinforcing rubber layers is improved by mitigating vibrations inputted to the tire from road, and cracking and heat generation and accumulation in the inner surface of the sidewall portion of the tire become unlikely to occur through the prevention of local stress concentration.

Furthermore, since the first reinforcing rubber layer 50 is continued to the second reinforcing rubber layer 60 through the inclined joint surface 70 on the radially inner side, a conventional rigid discontinuous face disappears in the sidewall portion 10 to improve anti-vibration riding comfortability. Moreover, since the local stress concentration is prevented from occurring on the inner surface of the sidewall portion 10, boundary fracture of the first reinforcing rubber layer 50 and the second reinforcing rubber layer made of different rubber materials can be prevented.

Therefore, the pneumatic safety tire according to the present invention has not only excellent anti-vibration riding comfortability but also durability in the upper part of the sidewall portion. Particularly, the pneumatic tire of the invention has excellent performance as a tire directed to run-flat running.

Experiment

The construction and effects of the pneumatic safety tire according to the present invention will be further explained with reference to the following test examples.

The construction shown in FIG. 1 was employed in a pneumatic tire having a tire size of 255/40ZR17, and this tire was subjected to evaluations of durability, anti-vibration riding comfortability.

That is, two plies composed of rayon cords 1650d/3 arranged at 90° in a circumferential direction of the tire were used as a carcass 30, and two plies composed of steel cords 1×5×0.23 arranged at 68° in the tire circumferential direction were used as the belt layer 32 while the cords in one ply were crossed to those in the other. An auxiliary belt layer 33 was used a ply formed by spirally winding a nylon cord 1260d/2 in a direction substantially parallel to the circumferential direction of the tire.

As the first reinforcing rubber layer 50, rubber having a Shore A hardness of 80 and resilience of 85 was used, and heights $h_1$ and $h_4$ of a radially outer end and a radially inner end of the first reinforcing rubber layer were set at 87% and 35% of a height H of the tire, respectively.

As the second reinforcing rubber 60, rubber having a Shore A hardness of 85 and resilience of 80 was used, and a height $h_2$ of a radially outer end of the second reinforcing rubber layer was set at 50% of the height H of the tire.

As the rubber filler 40, rubber having a Shore A hardness of 98 was used, and a height $h_3$ of a radially outer end of the rubber filler was set at 30% of the height H of the tire, respectively.

The total volume of the entire reinforcing rubbers of the rubber filler 40, the first reinforcing rubber layer 50 and the second reinforcing rubber layer 60 was 960 cm$^3$, and the volumes of the reinforcing rubbers were 15% (rubber filler 40), 25% (second reinforcing rubber layer 60) and 60% (first reinforcing rubber layer 50), respectively, with respect to the total volume.

In addition, the inclined joint surface 70 as a boundary between the first reinforcing rubber layer 50 and the second reinforcing rubber layer 60 was set such that a straight line T' extending along the inclined joint surface 70 forms an angle $\theta = 60°$ as measured on an acute side with respect to a line parallel to center line 1-1 of the tire, the straight line T' being downwardly inclined toward the axially inner side of the tire.

Figure 2:
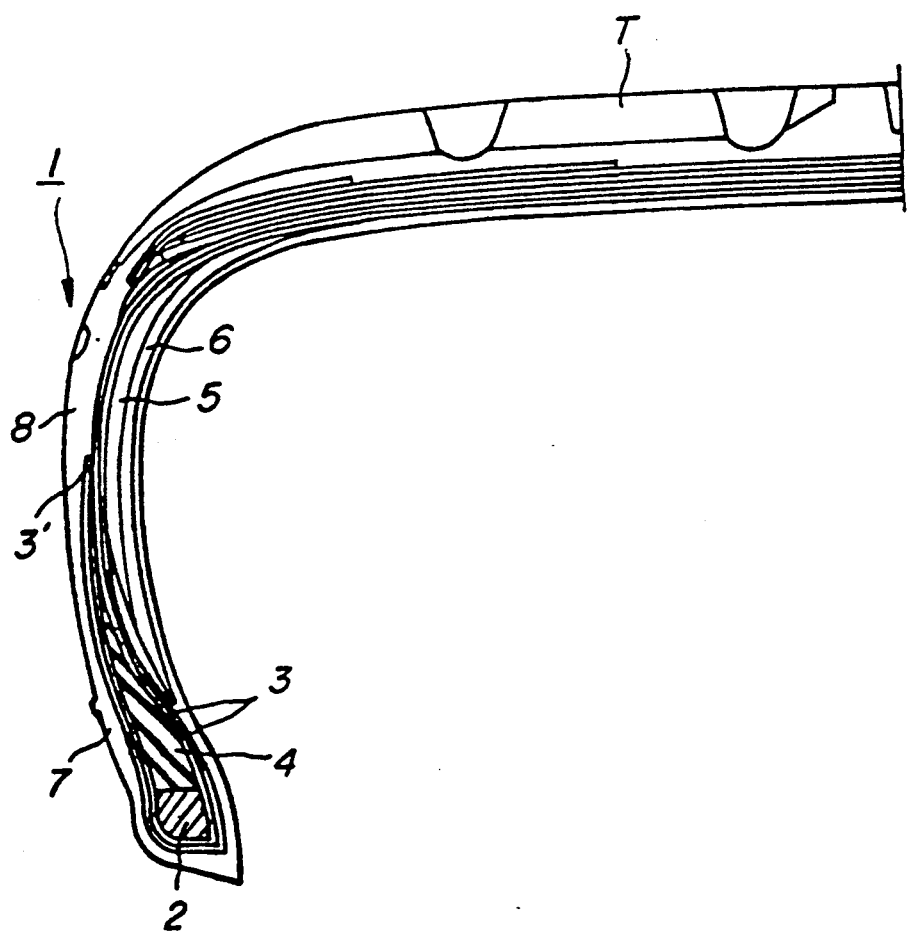
FIG. 2 is a sectional view illustrating the conventional safety tire.

On the other hand, a conventional tire having the construction shown in FIG. 2 was obtained for comparison purposes.

In this conventional tire, the construction was the same as that of the invention tire except for the following. That is, a first reinforcing rubber layer 50 had a Shore A hardness of 80 and resilience of 85, and amounted to a volume rate of 40% with respect to the total volume of the reinforcing rubbers. A second reinforcing rubber layer 60 had a Shore A hardness of 85 and resilience of 80, and amounted to a volume rate of 30% with respect to the total reinforcing rubbers. A filler rubber 40 had a Shore A hardness of 98, and occupied a volume rate of 30% with respect to the total reinforcing rubbers. A height of a radially outer end of the rubber filler was set at 40% of a height of the tire.

With respect to these two kinds of the tires, durability, anti-vibration riding comfortability were evaluated under the following conditions, and results are shown in the following table.

(1) Durability was evaluated as follows

Each of the tires was fitted under the same fitting conditions: a used rim No. 9J×17, and no internal pressure 0 kg/cm² (run-flat condition) and a load of 400 kg. The thus fitted tire was subjected to a running test on a drum having a diameter of 1.7 m with a camber angle of 0° at a speed of 90 km/h. A running distance which caused fracture in an upper part of the sidewall portion due to cracking or the like was measured. Durability was evaluated by index based on results obtained (The result of the conventional tire was taken as 100, and the larger the index, the more excellent is durability).

(2) Anti-vibration riding comfortability were evaluated as follows

Six force components were measured when the tire was run on the above drum, and anti-vibration riding comfortability was evaluated by index based on the six force components thus measured (The result of the conventional tire was taken as 100, and the larger the index, the more excellent is the anti-vibration riding comfortability.

|  | Conventional tire | Invention tire |
| --- | --- | --- |
| Durability | 100 | 250 |
| Anti-vibration riding comfortability | 100 | 110 |

As explained above in detail, the pneumatic safety tire according to the present invention has excellent anti-vibration riding comfortability as well as durability in the upper portion of the sidewall portion. In particular, the invention tire has excellent performances as the tires directed to run-flat running.

What is claimed is:

1. A pneumatic tire comprising; a cylindrical tread portion, a pair of sidewall portions radially inwardly extending from opposite ends of the tread portion and having respective bead rings buried at tip ends thereof, respectively, a radial carcass toroidally extending from one bead ring to the other bead ring through one sidewall portion, the tread potion and the other sidewall portion and also reinforcing the sidewall portions and the tread portion, each of opposite end portions of the carcass being turned u around the bead ring axially from inside to outside, rubber fillers each arranged between the turned-up portion and a main body of the carcass and extending from above the bead ring toward the tread portion such that the radially sectional shape of the rubber filler becomes narrower toward the tread portion, and a pair of thick rubber reinforcement layers arranged on respective axially inner sides of the carcass in the sidewall portions, wherein each of the rubber reinforcement layers is constituted by first and second reinforcing rubber layers, the first reinforcing rubber layer occupying a radially outer side of the sidewall portion and the second reinforcing layer being continued to a radially inner side of the first reinforcing rubber layer through an inclined joint surface and arranged on a radially outer side of the rubber filler through the main body of the carcass, and wherein a Shore A hardness of the first reinforcing rubber layer is less than the Shore A hardness of the second reinforcing rubber layer and the shore A hardness of the rubber filler is greater than that of the second reinforcing layer, and the rubber volumes of the rubber filler, the second reinforcing layer and the first reinforcing layer successively increases, wherein the volumes of the rubber filler, the second reinforcing rubber layer and the first reinforcing rubber layer of the total reinforcing rubber of the filler are 10 to 20%, 15 to 35% nd 45 to 70%, respectively.

2. The pneumatic safety tire according to claim 1, wherein the Shore A hardnesses of the rubber filler, the second reinforcing rubber layer and the first reinforcing rubber layer are 74° to 98°, 60° to 90°, and 60° to 85°, respectively.

3. The pneumatic safety tire according to claim 1, wherein resilience values of the first reinforcing rubber layer is smaller than that of the second reinforcing rubber layer.

4. The pneumatic safety tire according to claim 1, wherein the inclined joined surface is so inclined as to form an angle of 50° to 80° as measured on an acute angle side between a straight line extended from said joined surface and a line parallel to a tire axis, said straight line being downwardly inclined toward an axially inner side of the tire.

* * * * *